US011539625B2

(12) United States Patent
Chen et al.

(10) Patent No.: US 11,539,625 B2
(45) Date of Patent: Dec. 27, 2022

(54) PACKET PROCESSING SYSTEM AND PACKET PROCESSING METHOD THEREOF FOR DETECTING MICROBURSTS AND ACCORDINGLY PROCESSING PACKETS

(71) Applicants: Inventec (Pudong) Technology Corp., Shanghai (CN); Inventec Corporation, Taipei (TW)

(72) Inventors: Po-Jen Chen, Taipei (TW); Yu-Chieh Lin, Taipei (TW); Hung-Pin Wen, Taipei (TW); Chi-Hsiang Hung, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 43 days.

(21) Appl. No.: 17/120,274

(22) Filed: Dec. 14, 2020

(65) Prior Publication Data
US 2022/0078117 A1   Mar. 10, 2022

(30) Foreign Application Priority Data
Sep. 9, 2020   (CN) .................. 202010940682.X

(51) Int. Cl.
| H04L 47/122 | (2022.01) |
| H04L 47/10 | (2022.01) |
| H04L 45/00 | (2022.01) |
| H04L 43/16 | (2022.01) |
| H04L 43/0882 | (2022.01) |

(52) U.S. Cl.
CPC ........ *H04L 47/122* (2013.01); *H04L 43/0882* (2013.01); *H04L 43/16* (2013.01); *H04L 45/22* (2013.01); *H04L 47/29* (2013.01)

(58) Field of Classification Search
CPC ... H04L 47/122; H04L 43/0882; H04L 43/16; H04L 45/22; H04L 47/29
See application file for complete search history.

(56) References Cited

U.S. PATENT DOCUMENTS

| 10,587,486 | B2* | 3/2020 | Ayandeh ............. H04L 43/0876 |
| 10,862,813 | B2* | 12/2020 | Ghanwani ........... H04L 47/2441 |
| 2017/0012851 | A1* | 1/2017 | Teeter ................... H04L 47/263 |
| 2018/0063007 | A1* | 3/2018 | Johnson ................. H04L 49/50 |
| 2018/0351883 | A1* | 12/2018 | Calavrezo ............. H04L 49/506 |
| 2019/0042110 | A1* | 2/2019 | Bharadwaj ............. G06F 3/067 |

* cited by examiner

*Primary Examiner* — Donald L Mills
(74) *Attorney, Agent, or Firm* — Winston Hsu

(57) ABSTRACT

A packet processing system including an ingress unit, a detour launcher, a packet sequencer, a post-detour handler and an egress unit. The ingress unit is used to receive a packet. The detour launcher is used to detect a microburst according to at least a queue value and accordingly send the packet. The packet sequencer is used to attach a sequence number to the packet when the microburst emerges. The post-detoured handler is used to release the packet after the microburst has elapsed. The egress unit is used to output the packet processed by at least one member of a group consisting of the detour launcher, the packet sequencer and the post-detour handler.

7 Claims, 5 Drawing Sheets

PACKET PROCESSING SYSTEM AND PACKET PROCESSING METHOD THEREOF FOR DETECTING MICROBURSTS AND ACCORDINGLY PROCESSING PACKETS

BACKGROUND OF THE INVENTION

1. Field of the Invention

The application is related to a packet processing system and a packet processing method thereof, and more particularly, a packet processing system and a packet processing method thereof for detecting microbursts and accordingly processing packets.

2. Description of the Prior Art

As the demands and services related to network applications continue to increase, network traffic also continues to grow, resulting in a large number of packets to be transmitted between multiple switches. If a large number of packets arrive at the switch in a short time, it will cause congestion and easily lead to packet loss or delay. The above-mentioned problem can be referred to as a microburst. For example, the congestion of packets can occur in a microsecond time period. It is difficult to predict and solve microbursts. In order to detect microbursts, for example, snapshots of the network can be taken at regular intervals, and the differences between multiple snapshots can be compared to detect the microburst. However, this solution must use a large number of registers for storing the snapshots, and still cannot deal with microbursts in real time. In addition, the aforementioned solution requires the use of an external device for analysis, so it is difficult to perform in-network processing. Therefore, there is still a lack of suitable solutions in the field to reduce the problem of microbursts.

SUMMARY OF THE INVENTION

An embodiment provides a packet processing system including an ingress unit, a detour launcher, a packet sequencer, a post-detour handler and an egress unit. The ingress unit is used to receive a packet. The detour launcher is used to detect a microburst according to at least a queue value and accordingly send the packet. The packet sequencer is used to attach a sequence number to the packet when the microburst emerges. The post-detoured handler is used to release the packet after the microburst has elapsed. The egress unit is used to output the packet processed by at least one member of a group consisting of the detour launcher, the packet sequencer and the post-detour handler.

Another embodiment provides a packet processing method used by a packet processing system. The packet processing system includes an ingress unit, a detour launcher, packet sequencer and an egress unit. The processing method includes the ingress unit receiving a packet; the detour launcher detecting a microburst according to at least a queue value and accordingly sending the packet; and the egress unit outputting the packet processed by at least one member of a group consisting of the detour launcher and the packet sequencer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
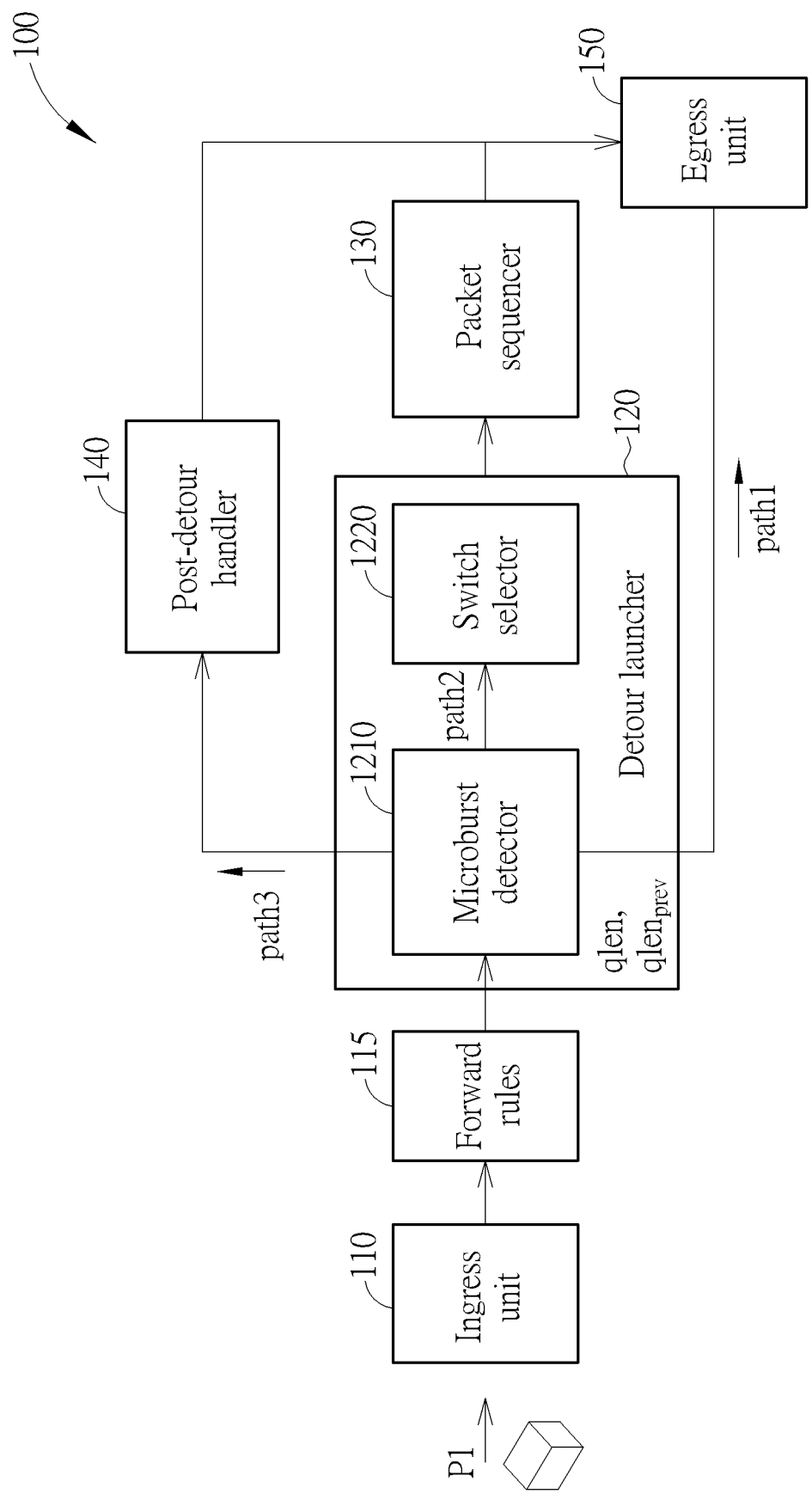
FIG. 1 illustrates a packet processing system according to an embodiment.

For dealing with the problems related to microburst, embodiments provide a packet processing system and a packet processing method thereof as described below. FIG. 1 illustrates a packet processing system 100 according to an embodiment. The packet processing system 100 can include an ingress unit 110, a detour launcher 120, a packet sequencer 130, a post-detour handler 140 and an egress unit 150. The ingress unit 110 is used to receive a packet P1. The detour launcher 120 can be used to detect a microburst according to at least a queue value qlen and accordingly send the packet P1. The packet sequencer 130 can be used to attach a sequence number to the packet P1 when the microburst emerges. For example, a sequence number can be attached on the header of the packet. The mentioned queue value can be the queue length of the packets. For example, when there are three packets in the queue, the queue value can be three. The post-detoured handler 140 can be used to release the packet P1 after the microburst has elapsed. The egress unit 150 can be used to output the packet P1 processed by at least one member of a group consisting of the detour launcher 120, the packet sequencer 130 and the post-detour handler 140. The system 100 shown in FIG. 1 can be implemented with software, hardware, or integrated software and hardware. The system 100 can be installed in a switch to detect and deal with microbursts in the network without using external devices for analysis and control. As shown in FIG. 1, after the ingress unit 110 receives the packet P1, the packet P1 can be sent to the detour launcher 120 according to forward rules 115.

As shown in FIG. 1, the detour launcher 120 can include a microburst detector 1210 and a switch selector 1220. The switch selector can be regarded as a port selector since a switch can be corresponding to a port according to embodiments. The switch selector 1220 can determine a target switch to output the packet P1 to the target switch using the egress unit 140. The target switch can be predetermined to be an upstream switch. If packet congestion emerges on the upstream switch, the target switch can be the switch with the smallest queue value. In other words, the packet P1 can be detoured and sent to the target switch. According to embodiments, techniques related to queue depth monitor (QDM) and/or real-time sorter (RTS) can be used to obtain the switch with the smallest queue value to be the target switch.

According to embodiments, the microburst detector 1210 can determine that the microburst has emerged when the queue value is greater than a threshold α for the detour launcher 120 to send the packet P1 to the packet sequencer

130. The packet P1 can be outputted to the target switch, and the target switch can send the packet P1 to the ingress unit 110 after the microburst has elapsed. In other words, when the microburst emerges, the packet P1 can be sent to another switch to perform a detour, and the packet P1 can be sent back to the original switch after the microburst has elapsed. When the microburst emerges, the packet P1 can be transmitted via the path path2 shown in FIG. 1.

According to embodiments, the packet processing system 100 can detect a microburst and accordingly issue a warning according to queue values qlen and $qlen_{prev}$. The queue value qlen can be corresponding to a first time, the queue value $qlen_{prev}$ can be corresponding to a second time, and the second time is before the first time. In other words, the queue value qlen can be the current queue value, the queue value $qlen_{prev}$ can be the previous queue value, the first time can be the current time, and the second time can be the previous time.

Figure 2:
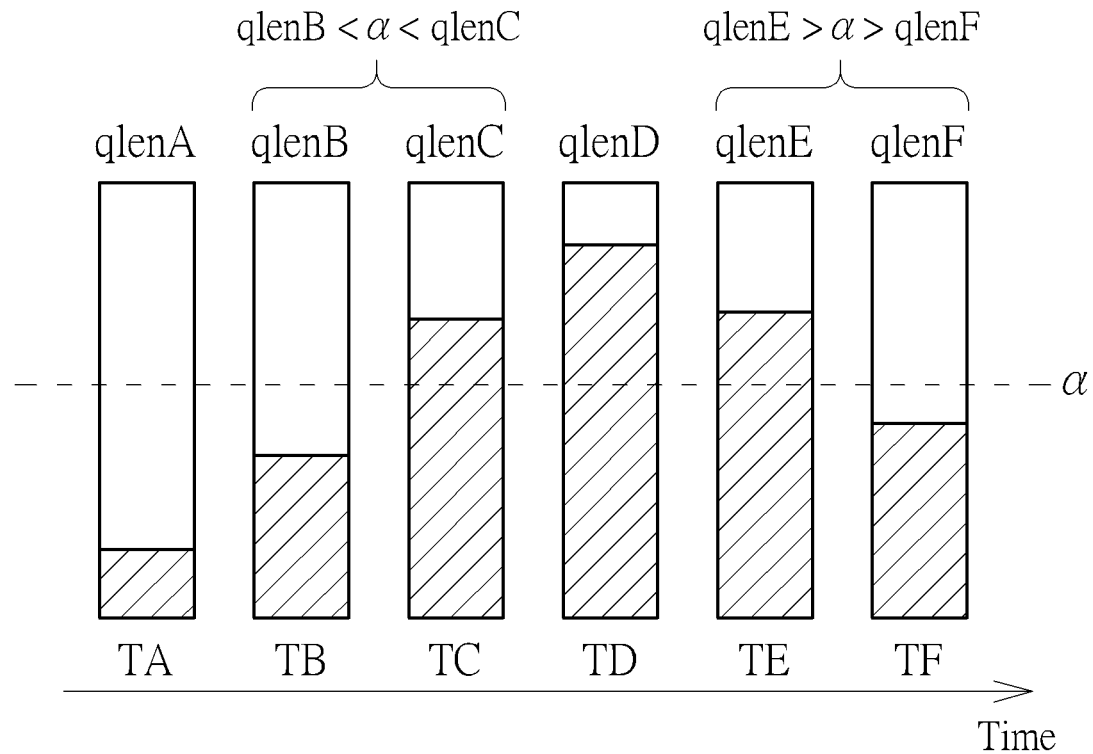
FIG. 2 illustrates the changes of the queue values according to an embodiment.

FIG. 2 illustrates the changes of the queue values according to an embodiment. FIG. 2 is only an example instead of limiting the scope of embodiments. The queue values qlenA to qlenF can respectively correspond to times TA to TF. As shown by the arrow, time TA is before time TB, time TB is before time TC, and so on, time TE is before time TF.

As shown in FIG. 2, between times TB and TC, the queue value can increase from qlenB to qlenC to exceed the threshold α, so the packet processing system 100 can signal the emergence of microburst. In this example, the queue values qlenB and qlenC can be corresponding to the aforementioned queue values $qlen_{prev}$ and qlen, and times TC and TB can be corresponding to the aforementioned first time and second time.

As shown in FIG. 2, between times TE and TF, the queue value can be lowered from qlenE to qlenF to be lower than the threshold α, so the packet processing system 100 can signal the end of the microburst. In this example, the queue values qlenE and qlenF can be corresponding to the aforementioned queue values qlenprev and qlen, and times TF and TE may be corresponding to the aforementioned first time and second time. By observing two queue values to signal the beginning and end of the microburst, it can avoid sending a warning for each packet, thereby reducing the workload.

According to an embodiment, at the ingress unit 110, if the switch detects that the queue value qlen is greater than the threshold α, the detour launcher 120 can send the packet P1 to the packet sequencer 130 for subsequent packet detour processing. If it is detected at the ingress unit 110 that the queue value qlen is smaller than the threshold α, a value can be taken from the result stored by the post-detour handler 140 to determine whether it is currently in: scenario 1: no microburst emerges, or scenario 2: the microburst has just elapsed and a predetermined period has not yet elapsed. For example, the predetermined period mentioned in scenario 2 can be a flowlet interval of TCP (Transmission Control Protocol). The relevant details are as follows.

When the packet is detoured, new packets in the same data stream can continue to flow into the switch. At this time, if the switch detects that the microburst has elapsed and determines to immediately stop the packet detour, the packet out-of-sequence problem may occur. The previous packets and the packets being detoured are still being transmitted between switches. For the switch, this situation will cause the previous and new packets to be mixed into the queue of the switch and sent out, and the packets may be further out of sequence.

In order to avoid the above problem, according to embodiments, the switch can continuously record the arrival time of the latest received packet. After the microburst has elapsed, the switch can continuously record the time of receiving the packet. The switch can measure the packet reception time difference (hereinafter time difference) between receiving a packet and receiving a subsequent packet. If the time difference is smaller than a predetermined time period, the time recorded on the switch can be continuously updated, and the packet detour can be continuously performed. The predetermined time period can be defined by a user, for example, be a flowlet interval of TCP. If the time difference is greater than a predetermined period, a notification can be sent to stop the detour. According to an embodiment, by means of this mechanism, the detour can be performed for at least the predetermined time period (e.g., the flowlet interval of TCP) before the detour is stopped. By means of this mechanism, the problem of packets being out of sequence caused by the mixing of new packets and old packets can be avoided at the end of the packet detour.

As shown in FIG. 1 and FIG. 2, when the queue value qlen is smaller than the threshold α and the time difference (as mentioned above) is greater than a predetermined time period (e.g., the flowlet interval of TCP), the microburst detector 1210 can determine the microburst has not emerged. The packet P1 can be accordingly sent to the egress unit 150 to be outputted. In other words, the packet P1 can be sent via the path path1 shown in FIG. 1.

As shown in FIG. 1 and FIG. 2, when the queue value qlen is smaller than the threshold α and the time difference is smaller than a predetermined time period (e.g., the flowlet interval of TCP), the microburst detector 1210 can determine the microburst has just elapsed. The post-detoured handler 140 can output the packet through the egress unit 150 according to the sequence number of the packet P1. In other words, the packet P1 can be transmitted via the path path3. In this scenario, the sequence number of the packet P1 can be previously attached by the packet sequencer 130, and the packet P1 can be a packet sent back to the ingress unit 110 after being detoured.

Figure 3:
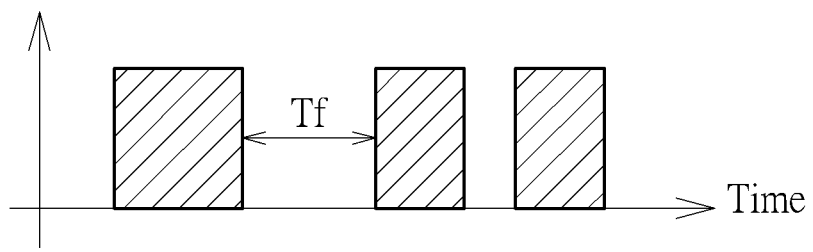
FIG. 3 illustrates the line speed of transmitting packets according to an embodiment.

FIG. 3 illustrates the line speed of transmitting packets according to an embodiment. As above, after the microburst has elapsed, the post-detoured handler 140 shown in FIG. 1 can release the detoured packet P1 according to the sequence number of the packet P1 to avoid the packets being out-of-sequence. The post-detoured handler 140 can release the detoured packet P1 through the egress unit 150 according to the sequence number of the packet P1 during the flowlet interval Tf.

Figure 4:
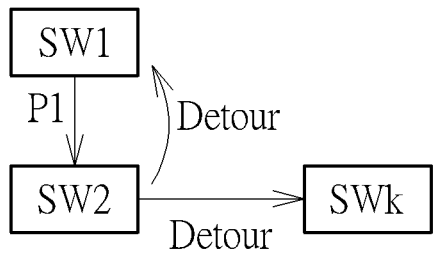
FIG. 4 illustrates the packet transmitted among the switches according to an embodiment.

FIG. 4 illustrates the packet P1 transmitted among the switches according to an embodiment. The packet P1 can be preset to be sent to the downstream switch SW2. However, when the microburst is detected because the queue value of the switch SW2 exceeds the threshold, an appropriate target switch can be selected to detour the packet to the target switch. The target switch can be preset to be the upstream switch. For example, in FIG. 4, the upstream switch of the switch SW2 can be the switch SW1. The reason is that under the many-to-one flow structure, selecting the upstream switch can spread the flow burden of each port. If the upstream switch is also congested with a large queue value, the target switch can be a switch with a smaller queue value, such as the switch SWk shown in FIG. 4. The switch SWk can be a neighbor switch of the switch SW2.

Figure 5:
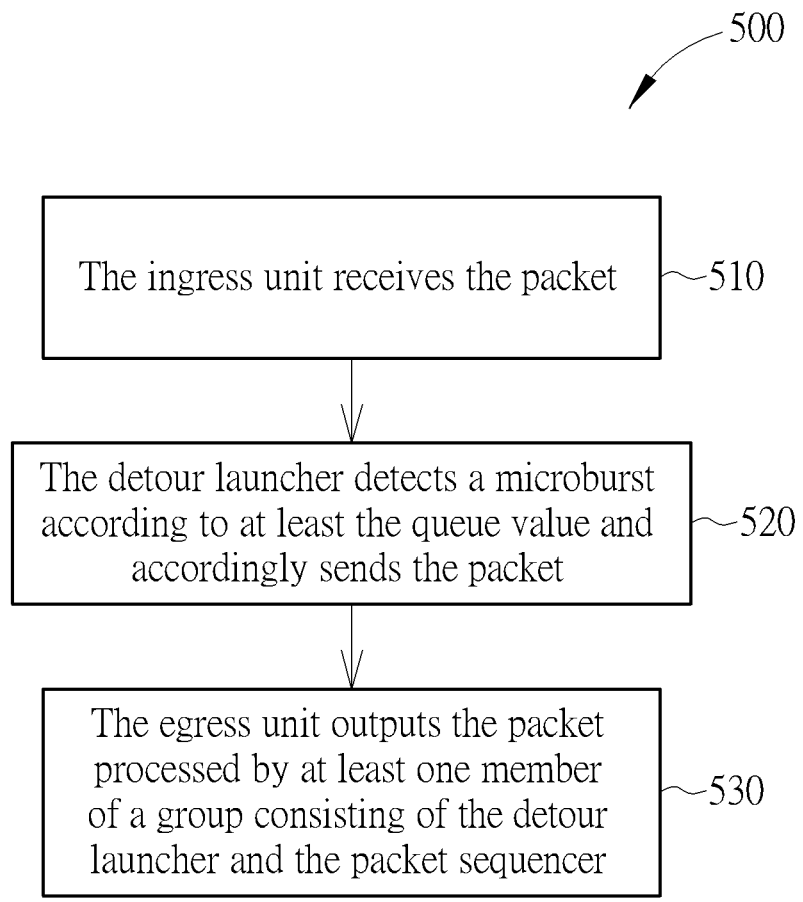
FIG. 5 illustrates the flowchart of the packet processing method used by the packet processing system shown in FIG. 1.

FIG. 5 illustrates the flowchart of the packet processing method 500 used by the packet processing system 100 shown in FIG. 1. The packet processing method 500 can include following steps.

Step 510: the ingress unit 110 receives the packet P1;

Step 520: the detour launcher 120 detects a microburst according to at least the queue value qlen and accordingly sends the packet P1; and Step 530: the egress unit 150 outputs the packet P1 processed by at least one member of a group consisting of the detour launcher 120 and the packet sequencer 130.

Figure 6:
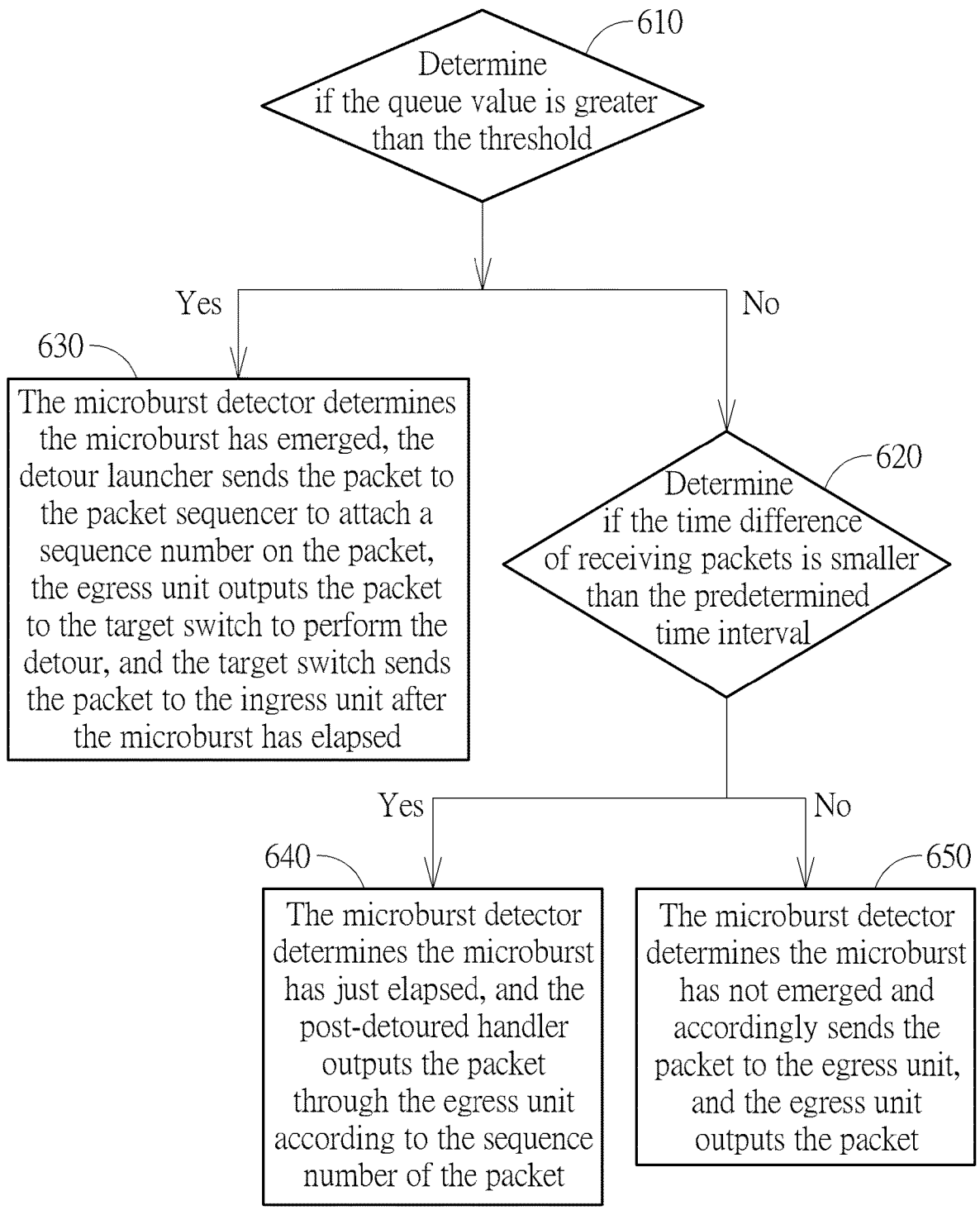
FIG. 6 illustrates the flowchart of detecting the microburst and performing related operations.

As above, the packet processing system 100 can detect the microburst according to the first queue value qlen (i.e. the current queue value) and the second queue value $qlen_{prev}$ (i.e. the previous queue value). Hence, Step 520 and Step 530 can be performed as described in FIG. 6. FIG. 6 illustrates the flowchart of detecting the microburst and performing related operations.

Step 610: determine if the queue value is greater than the threshold α; if so, enter Step 630; else enter Step 620;

Step 620: determine if the time difference of receiving packets is smaller than the predetermined time interval; if so, enter Step 640; else enter Step 650;

Step 630: the microburst detector 1210 determines the microburst has emerged, the detour launcher 120 sends the packet P1 to the packet sequencer 130 to attach a sequence number on the packet P1, the egress unit 150 outputs the packet P1 to the target switch (as described above) to perform the detour, and the target switch sends the packet P1 to the ingress unit 110 after the microburst has elapsed.

Step 640: the microburst detector 1210 determines the microburst has just elapsed, and the post-detoured handler 140 outputs the packet P1 through the egress unit 150 according to the sequence number of the packet P1.

Step 650: the microburst detector 1210 determines the microburst has not emerged and accordingly sends the packet P1 to the egress unit 150, and the egress unit 150 outputs the packet P1.

As shown in FIG. 1, FIG. 5 and FIG. 6, Step 610 and Step 620 can relate to Step 520. Step 630 to Step 650 can relate to Step 530 and respectively relate to the paths path1, path2 and path3. The threshold α can be obtained according to experiments and statistics to avoid excessively high or low frequency of detouring packets. The time difference mentioned in Step 620 can be between receiving the packet P1 and receiving another packet (e.g., the previous packet). The predetermined time interval can be the flowlet interval or another suitable time interval.

Figure 7:
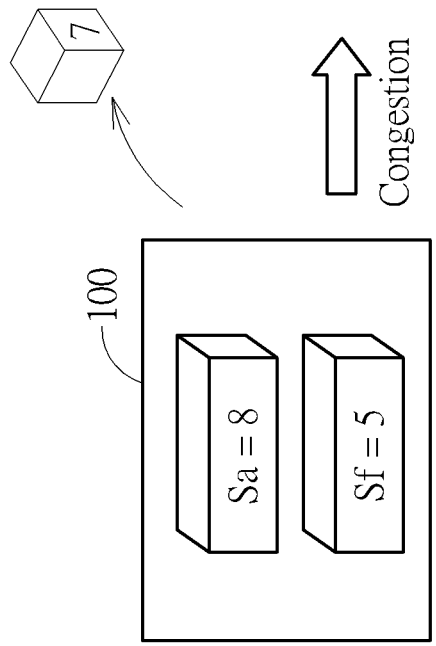
FIG. 7 to FIG. 10 illustrate an example of processing packets according to an embodiment.
Figure 8:
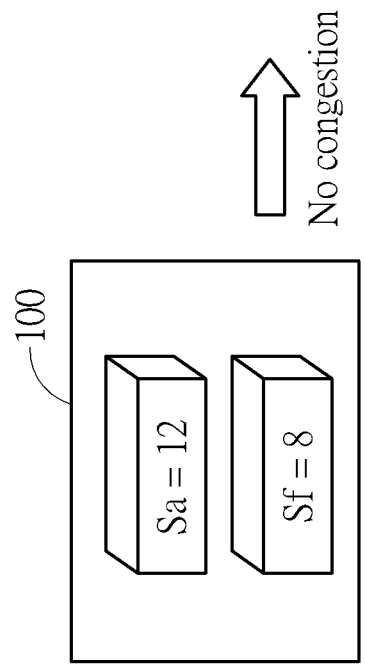
Figure 9:
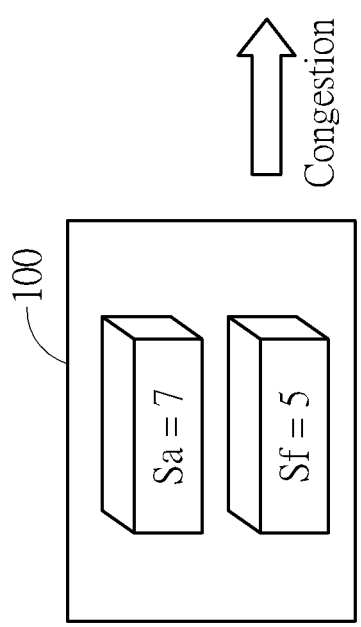
Figure 10:
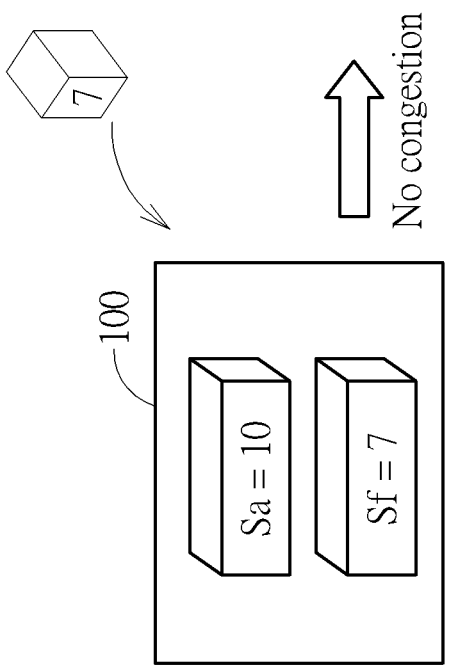

FIG. 7 to FIG. 10 illustrate an example of processing packets according to an embodiment. FIG. 7 and FIG. 8 are scenarios where the queue value qlen is greater than the threshold α, and the packet detour is performed. FIG. 9 and FIG. 10 are scenarios where the queue value qlen has decreased below the threshold α. In FIG. 7 to FIG. 10, the packets are expressed with square patterns. The sequence number Sa is the sequence number of the next packet to be detoured, and the sequence number Sf is the sequence number of the next packet that can be released by the egress unit 150.

FIG. 7 to FIG. 10 are in a chronological order. In other words, the scenarios of FIG. 7, FIG. 8, FIG. 9 and FIG. 10 can occur in sequence. FIG. 7 to FIG. 10 are merely an example instead of limiting the scope of embodiments.

In FIG. 7, the microburst emerges, and the packet processing system 100 receives new packets. Because the queue value of packets exceeds the threshold α, the microburst has emerged and congestion occurs at the output of the system 100. The packet with the sequence number 5 is the packet that has come back after a previous detour and is to be released. The packet with sequence number 7 is the currently received packet and is to be detoured.

In FIG. 8, the microburst has not elapsed and the output of the packet processing system 100 is still congested. The packet with sequence number 7 has been detoured to the target switch; for example, the packet can be detoured to the upstream switch or a switch with a lower queue value.

In FIG. 9, the packet with sequence number 7 is sent back to the original switch corresponding to the packet processing system 100 to become the next packet that can be released and outputted. In addition, the packets with sequence numbers 8 and 9 are being detoured, so the sequence number Sa of the packet to be detoured can be 10.

In FIG. 10, since the packet with sequence number 7 has been released, the packet with sequence number 8 can be the next packet to be released. In addition, the packets with sequence numbers 9, 10 and 11 can be detoured. The packet with sequence number 12 can be the next packet to be detoured.

As shown in FIG. 9 and FIG. 10, after being detoured, the packet with the sequence number 7 can be outputted first, and then the packet with the sequence number 8 can be outputted. Therefore, by managing the sequence numbers of the packets returned after being detoured, the packets after being detoured can be released in order to avoid the out-of-sequence problem.

In summary, the embodiments can provide a solution using orderly packet detour with a predetermined time interval (e.g., flowlet interval) to deal with the microbursts in a datacenter. An in-network solution is provided without using an external device to perform a large amount of analysis, and it can be avoided to take snapshots. Solutions are also provided for the details of the detour and to overcome possible out-of-sequence issues. It can reduce the long-standing difficult problem of microburst in the field.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A packet processing system comprising:
an ingress unit configured to receive a packet;
a detour launcher configured to detect a microburst and accordingly send the packet, wherein the detour launcher comprises a microburst detector and a switch selector, the microburst detector is configured to determine the microburst according to at least a queue value, and the switch selector is configured to determine a target switch;
a packet sequencer configured to attach a sequence number to the packet when the microburst emerges;
a post-detoured handler configured to release the packet after the microburst has elapsed; and
an egress unit configured to output the packet processed by at least one member of a group consisting of the detour launcher, the packet sequencer and the post-detour handler;
wherein the microburst detector determines the microburst has emerged when the queue value is greater than a threshold, the detour launcher sends the packet to the packet sequencer, the packet sequencer attaches the sequence number to the packet, the egress unit outputs the packet to the target switch determined by the switch selector, and the target switch sends the packet to the ingress unit after the microburst has elapsed.

2. The packet processing system of claim 1, wherein the microburst detector is configured to detect the microburst according to a time difference between receiving the packet and receiving another packet.

3. The packet processing system of claim 2, wherein:
the microburst detector determines the microburst has not emerged when the queue value is smaller than a threshold and the time difference is greater than a predetermined time period, and the packet is accordingly sent to the egress unit to be outputted.

4. The packet processing system of claim 2, wherein:
the microburst detector determines the microburst has just elapsed when the queue value is smaller than a threshold and the time difference is smaller than a predetermined time period, and the post-detoured handler outputs the packet through the egress unit according to the sequence number of the packet.

5. A packet processing method used by a packet processing system, the packet processing system comprising an ingress unit, a detour launcher, a packet sequencer and an egress unit, the detour launcher comprising a microburst detector and a switch selector, the microburst detector being configured for determining the microburst according to at least a queue value, the switch selector being configured for determining a target switch, and the processing method comprising:
the ingress unit receiving a packet;
the detour launcher detecting a microburst and accordingly sending the packet; and
the egress unit outputting the packet processed by at least one member of a group consisting of the detour launcher and the packet sequencer;
wherein the detour launcher determines the microburst has emerged when the queue value is greater than a threshold, the detour launcher sends the packet to the packet sequencer, the packet sequencer attaches a sequence number to the packet, the egress unit outputs the packet to the target switch determined by the switch selector, and the target switch sends the packet to the ingress unit after the microburst has elapsed.

6. The packet processing method of claim 5, wherein the packet processing system further comprises a post-detoured handler, and the packet processing method further comprises:
the detour launcher determining the microburst has just elapsed when the queue value is smaller than a threshold and a time difference between receiving the packet and receiving another packet is smaller than a predetermined time period; and
the post-detoured handler outputting the packet through the egress unit according to a sequence number of the packet.

7. The packet processing method of claim 5, further comprising:
the detour launcher determining the microburst has not emerged and accordingly sending the packet to the egress unit when the queue value is smaller than a threshold and a time difference between receiving the packet and receiving another packet is greater than a predetermined time period; and
the egress unit outputting the packet.

* * * * *